W. C. LEIMBACH, Jr. & F. H. GRIMBERG.
COFFEE OR TEA POT.
APPLICATION FILED AUG. 16, 1909.
960,353.
Patented June 7, 1910.
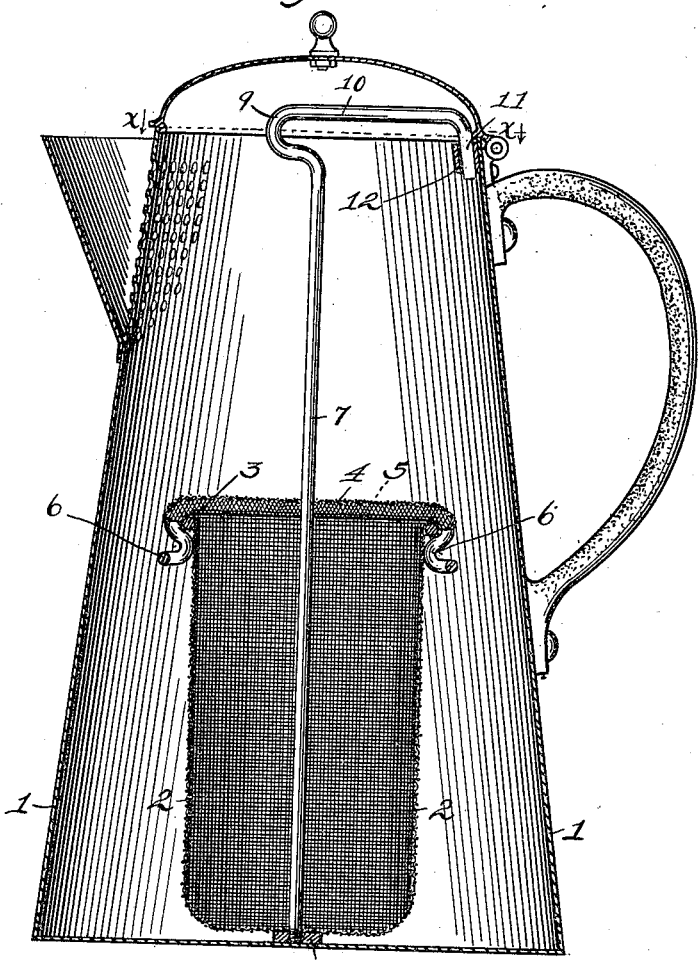
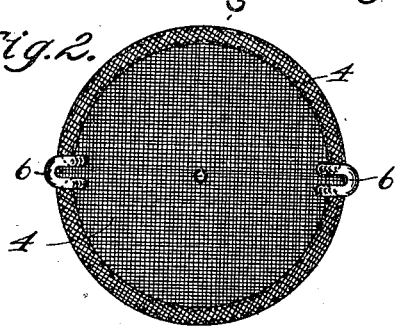
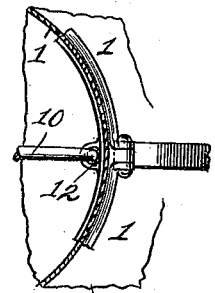
Witnesses:
C. E. Wessels
B. G. Richards
Inventors:
William C. Leimbach Jr.
And
Frederich H. Grimberg,
By Joshua R H Potts
Their Attorney.

UNITED STATES PATENT OFFICE.

WILLIAM C. LEIMBACH, JR., AND FREDERICH H. GRIMBERG, OF HAMMOND, INDIANA.

COFFEE OR TEA POT.

960,353.  Specification of Letters Patent.  Patented June 7, 1910.

Application filed August 16, 1909. Serial No. 513,074.

*To all whom it may concern:*

Be it known that we, WILLIAM C. LEIMBACH, Jr., and FREDERICH H. GRIMBERG, citizens of the United States, residing at Hammond, county of Lake, and State of Indiana, have invented certain new and useful Improvements in Coffee or Tea Pots, of which the following is a specification.

Our invention relates to improvements in coffee or tea pots and has for its object the production of a coffee or tea pot provided with a coffee or tea retainer which may be readily placed and secured in position in said pot and which shall have improved means for opening and closing the same.

Our invention consists in the combination and arrangement of parts hereinafter described and claimed.

Our invention will be best understood by reference to the accompanying drawings forming a part of this specification, and in which, Figure 1 is a vertical section of a pot embodying our invention, Fig. 2, a bottom plan view of the cover for the coffee or tea retainer, and Fig. 3, a partial section on line $x$—$x$ of Fig. 1.

The pot 1 is provided with a retainer for containing the coffee or tea and which comprises a body portion 2 composed of wire netting and provided with a central aperture in its bottom. The upper edges of the body portion 2 are secured to an annular wire 3 which thus forms an outwardly projecting rim for said body portion. The cover for said body portion consists of a wire netting disk provided with a central aperture and having its periphery secured to an annular wire 5. At diametrically opposite points the wire 5 is bent to form downwardly and inwardly spring loops 6 adapted to snap over wire 3 and secure the cover in position. The retainer is supported and positioned on a rod 7 passing through the apertures in the cover and bottom thereof and provided with a threaded nut 8 on its lower end under the bottom of the retainer. At its upper end the rod 7 is provided with a handle loop 9 and a horizontally extending arm 10 having a downwardly extending end 11. A bracket 12 is secured to the side of the pot near its top and is provided with a socket adapted to receive the downwardly extending end 11. By these means it will be seen that the retainer 2 may be readily placed in a central submerged position in the pot or removed therefrom and that the cover for the retainer may be readily removed and replaced for replenishing the same.

While we have illustrated and described the preferred construction for carrying our invention into effect, this is capable of variation and modification without departing from the spirit of our invention. We, therefore, do not wish to be limited to the exact details of construction set forth, but wish to avail ourselves of such variations and modifications as come within the scope of the appended claims.

Having described our invention what we claim as new and desire to secure by Letters Patent is:

1. In a device of the class described, the combination with a pot, of a retainer comprising a wire netting body portion having its upper edges secured to an annular wire forming an outwardly extending rim for said body portion, and the bottom of said body portion being provided with a central aperture; a cover for said body portion comprising a wire netting disk having an annular wire secured around its periphery, the said wire being bent to form inwardly and downwardly extending spring loops adapted to spring over said rim wire of said body portion and secure said cover in position, and the said disk being provided with a central aperture; a securing rod passing through said cover and bottom apertures, a threaded nut on the bottom of said rod; and means for securing said rod to said pot, substantially as described.

2. In a device of the class described, the combination with a pot, of a retainer comprising a wire netting body portion having its upper edges secured to an annular wire forming an outwardly extending rim for said body portion, and the bottom of said body portion being provided with a central aperture; a cover for said body portion comprising a wire netting disk having an annular wire secured around its periphery; the said wire being bent to form inwardly and downwardly extending spring loops adapted to spring over said rim wire of said body portion and secure said cover in position, and the said disk being provided with a central aperture; a securing rod passing through said apertures in said cover and bottom, the said rod being provided with a handle loop at its upper end and a horizontally extending arm provided with a downwardly extending end; a threaded nut on the bottom of said rod; and a bracket on the side of said pot near the top, provided with a socket adapted to receive said downwardly extending end, substantially as described.

In testimony whereof we have signed our names to this specification in the presence of two subscribing witnesses.

WILLIAM C. LEIMBACH, Jr.
FRED. H. GRIMBERG.

Witnesses:
ARTHUR A. OLSON,
JOSHUA R. H. POTTS.